(No Model.) 6 Sheets—Sheet 1.

S. P. WATT.
BLOWING ENGINE.

No. 456,643. Patented July 28, 1891.

Witnesses
N. B. Harris
K. B. Brereton

Inventor
Sern P. Watt
By Wm. H. Brereton
Attorney (No Model.)
6 Sheets—Sheet 3.

S. P. WATT.
BLOWING ENGINE.

No. 456,643.  Patented July 28, 1891.

(No Model.) 6 Sheets—Sheet 4.

S. P. WATT.
BLOWING ENGINE.

No. 456,643. Patented July 28, 1891.

Witnesses
M. B. Harris
K. B. Brereton

Inventor
Sern P. Watt
By Wm H. Brereton
Attorney (No Model.) 6 Sheets—Sheet 5.

S. P. WATT.
BLOWING ENGINE.

No. 456,643. Patented July 28, 1891.

Witnesses
K. B. Harris
K. B. Brereton

Inventor
Sern P. Watt
By Wm H. Brereton
Attorney (No Model.)

6 Sheets—Sheet 6.

S. P. WATT.
BLOWING ENGINE.

No. 456,643.

Patented July 28, 1891.

Witnesses
M. B. Harris
K. B. Brereton

Inventor
Sem P. Watt
By Wm H. Brereton
Attorney

UNITED STATES PATENT OFFICE.

SERN P. WATT, OF COLUMBUS, OHIO, ASSIGNOR TO THE COLUMBUS MACHINE COMPANY, OF SAME PLACE.

BLOWING-ENGINE.

SPECIFICATION forming part of Letters Patent No. 456,643, dated July 28, 1891.

Application filed July 5, 1890. Serial No. 357,801. (No model.)

*To all whom it may concern:*

Be it known that I, SERN P. WATT, a citizen of the United States, residing at Columbus, in the county of Franklin and State of Ohio, have invented certain new and useful Improvements in Blowing-Engines; and I do declare the following to be a full, clear, and exact description of the invention, such as will enable others skilled in the art to which it appertains to make and use the same.

My invention has relation to an improvement in double-action blowing-engines for blast-furnaces; and it consists in the construction and novel arrangement of parts, as hereinafter more fully described, illustrated in the accompanying drawings, and pointed out in the appended claims.

The objects of my invention are, first, to provide a blowing-engine of simple and inexpensive construction whereby surrounding air is drawn into an air-cylinder through a peculiar-shaped head at the top and bottom of the cylinder, said heads being provided with eduction and induction ports; secondly, to provide peculiarly-constructed valves for the eduction and induction ports that can be readily replaced; thirdly, to so construct my improved blowing-engine that when the engine is on the downstroke the valves covering the induction-ports at the top of the cylinder will be opened and the eduction-ports closed, and the induction-ports at the lower end of the cylinder closed and the eduction-ports opened.

Figure 1:
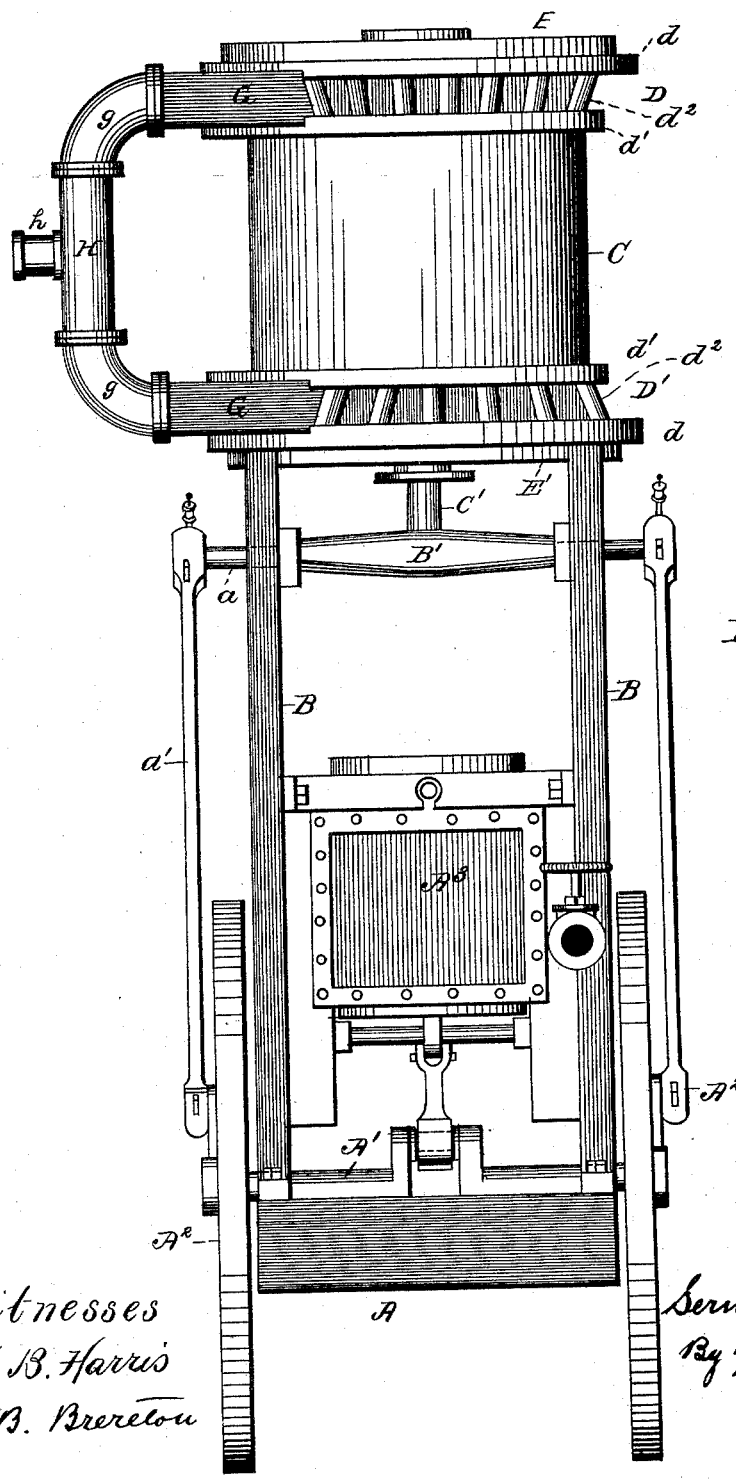
Figure 2:
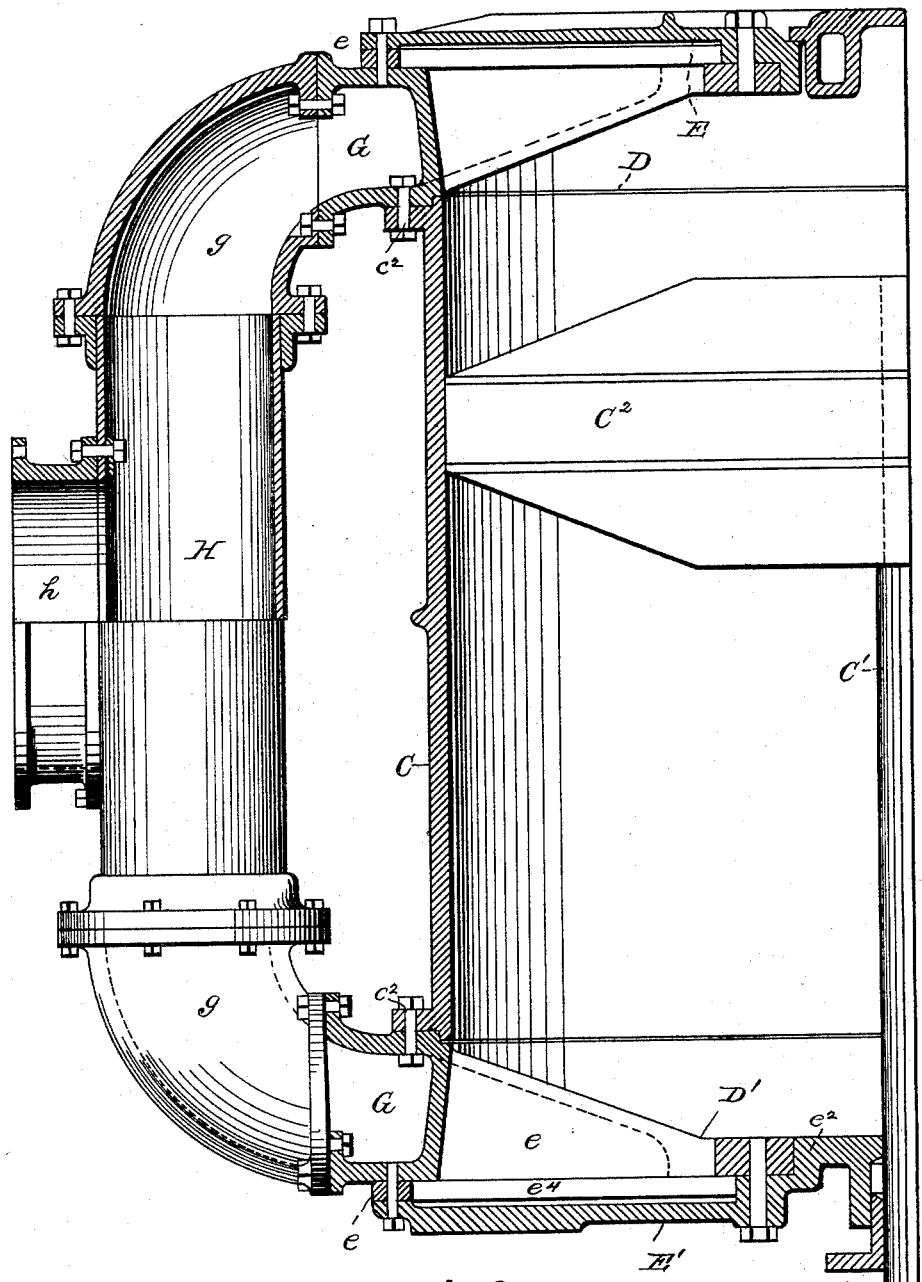
Figure 3:
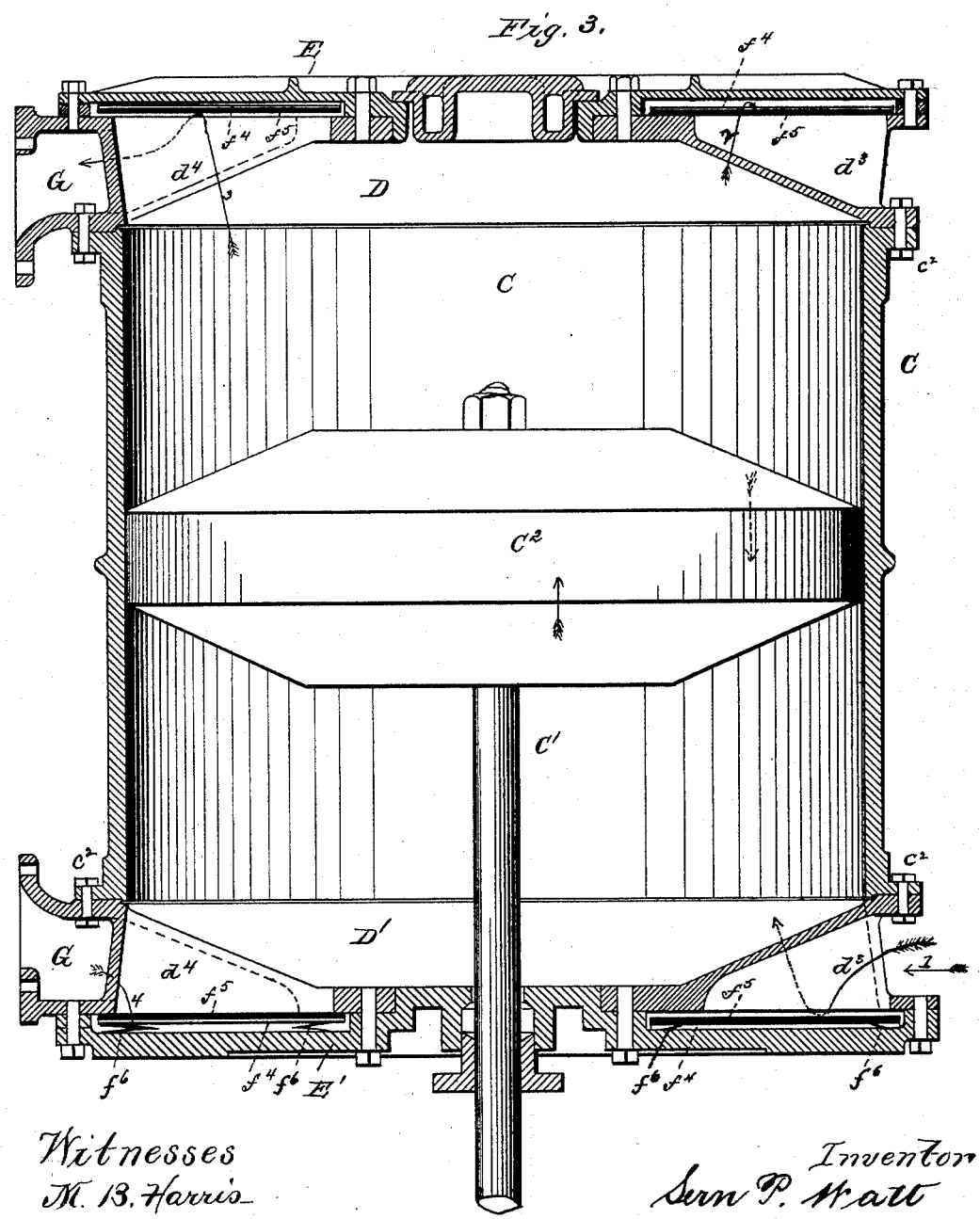
Figure 4:
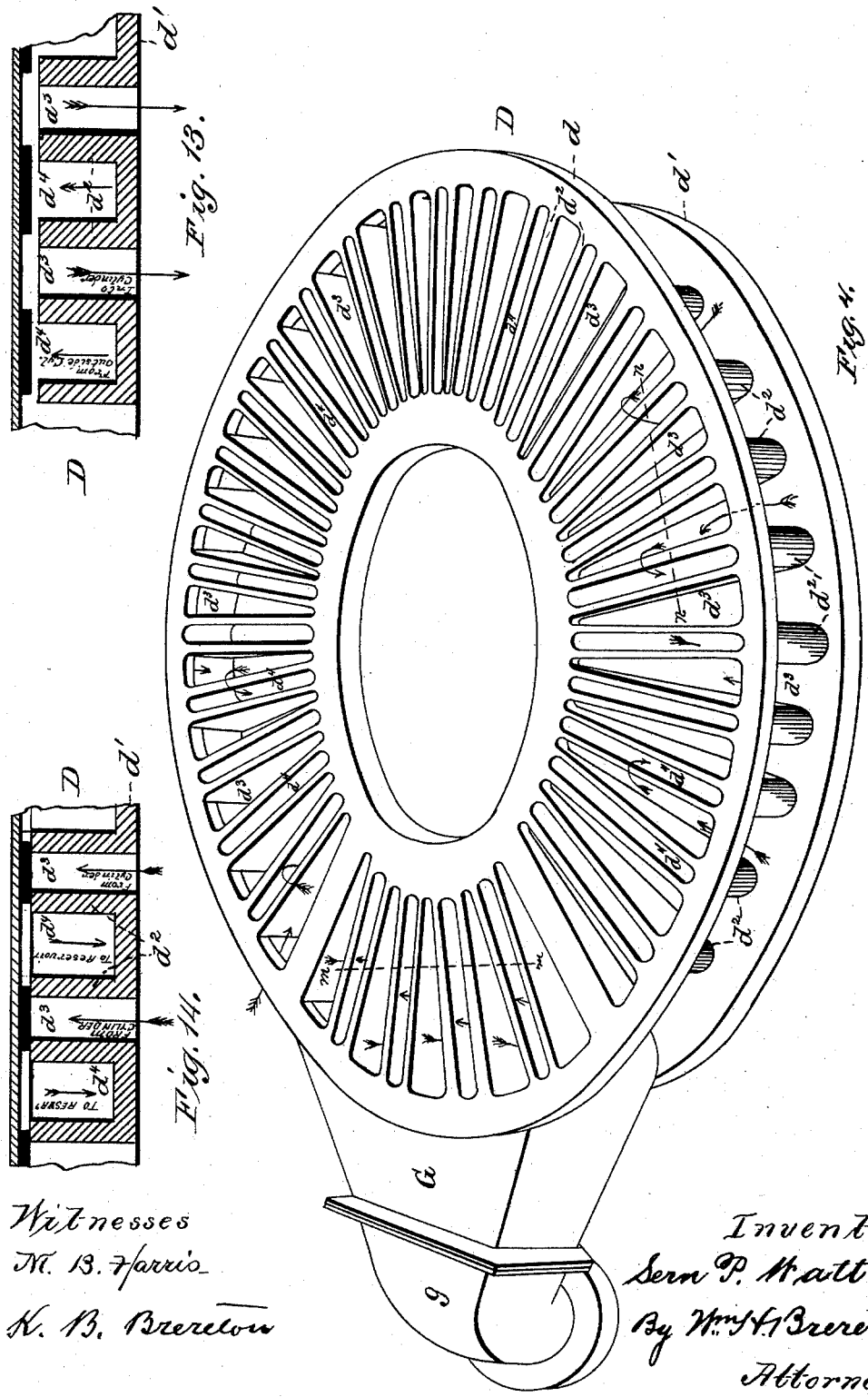
Figure 5:
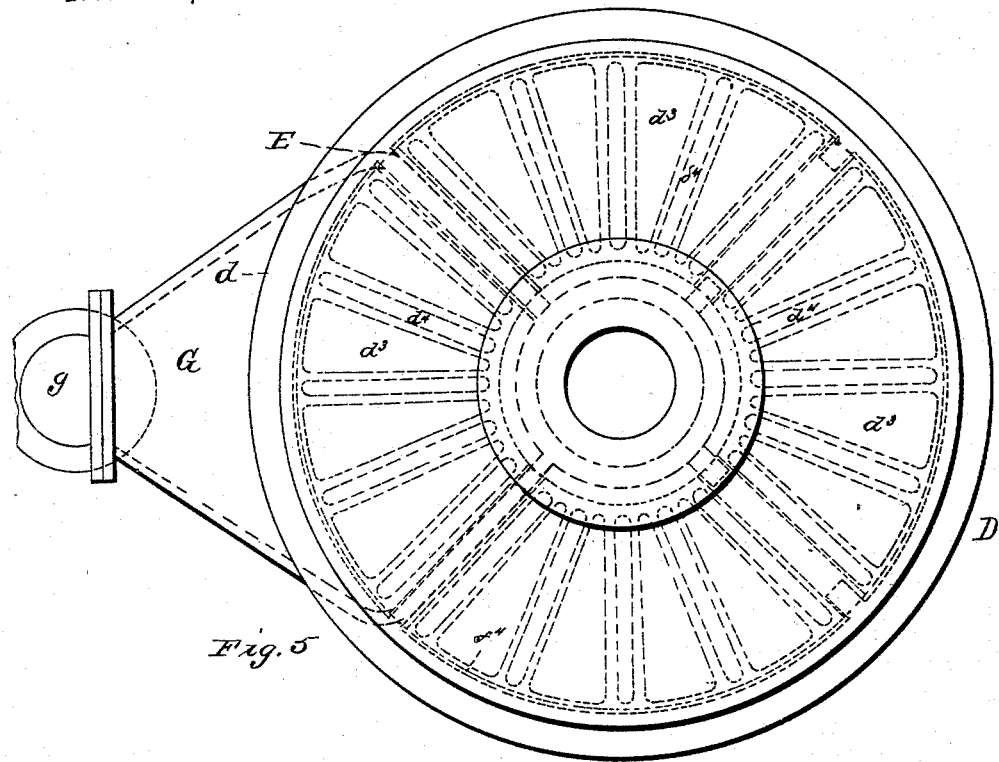
Figure 6:
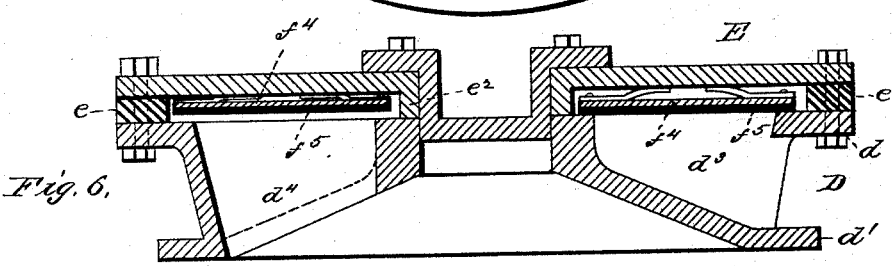
Figure 7:
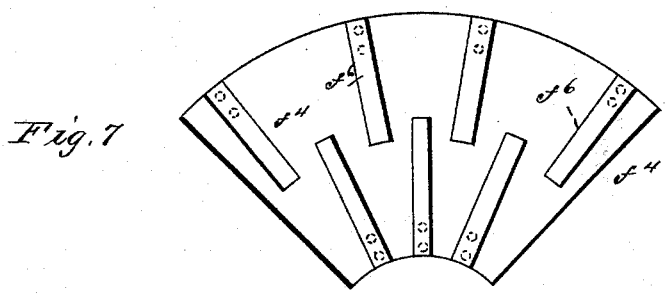
Figure 8:
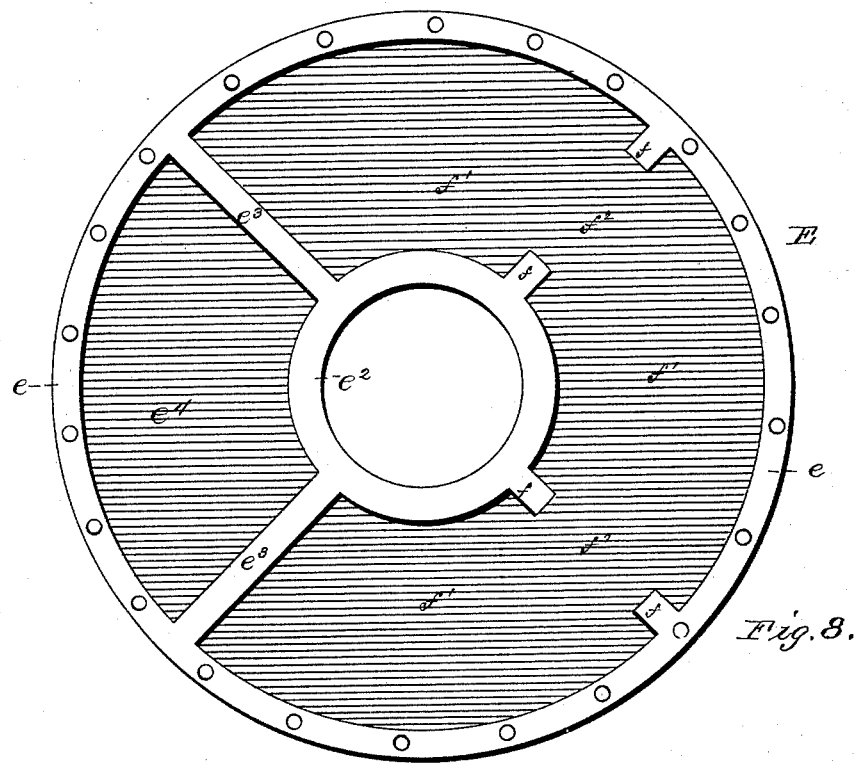
Figure 9:
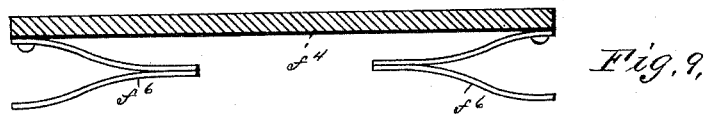
Figure 10:
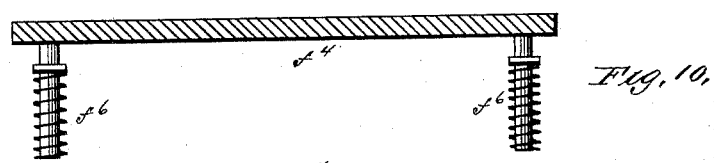
Figure 11:
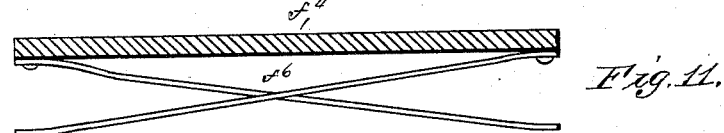
Figure 12:
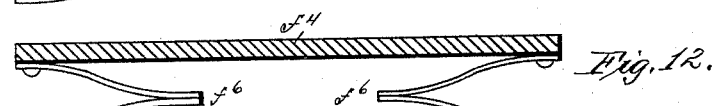

Figure 1 is a front elevation of a blowing-engine embodying my improvements. Fig. 2 is a vertical section of one-half of the air-cylinder and pipes. Fig. 3 is a vertical section of the air-cylinder, showing position of valves and course of air when the engine is on the upstroke. Fig. 4 is a perspective view of one of the heads. Fig. 5 is a plan view of the cylinder, showing eduction and induction ports in dotted lines below the cover E; Fig. 6, a vertical section of one of the heads through the eduction and induction ports; Fig. 7, a detail view of one of the metallic valve-plates, showing springs in position; Fig. 8, an inverted plan view of one of the covers. Figs. 9, 10, 11, and 12 are modified forms of springs that may be used on the valve-plates. Fig. 13 is a vertical section of head, Fig. 4, on line $n\,n$, showing valves over induction-ports. Fig. 14 is a like view on line $m\,m$, Fig. 4, showing valves in position on eduction-ports.

Referring to the accompanying drawings, in which like letters of reference indicate corresponding parts in all the figures, the letter A designates the base of the engine, having secured upon it and rising at right angles therefrom the frame B, carrying at its upper end and secured thereto in any desired manner the air-cylinder C. At the base of the engine, between the uprights of the frame and journaled in suitable bearings, is a crank-shaft A', carrying at each end a balance-wheel A². At a suitable point between the uprights and secured thereto in any desired manner is the steam-cylinder and steam-chest A³, of the usual well-known type, and at the upper ends of the uprights are formed ways, in which are adapted to slide a cross-head B', secured to the lower end of the piston-rod C', passing through a stuffing-box at the lower end of the air-cylinder, said rod carrying at its upper end a piston-head C² of peculiar construction. Loosely pivoted to wrist-pins $a$, extending laterally from both ends of the cross-head B', are connecting-rods $a'\,a'$, their opposite ends being pivoted to wrist-pins projecting from the balance-wheels A².

The letters D and D' designate heads secured to the upper and lower ends of the air-cylinder C by stud-bolts $c^3$ and formed of the outer flange $d$ and the inner flange $d'$, said flanges being connected by vertical radial walls or partitions $d^2$, forming air-induction ports $d^3$, as shown in Fig. 4. Between said openings in the outer flanges $d$ are formed the radial suction-ports $d^4$, which for about one-fourth of the circumference of the heads D and D' at certain positions of the piston-head act as exhaust-ports, as will hereinafter more fully appear.

In order that the induction, eduction, and exhaust ports may be opened and closed when it is desired to force the air within the cylinder through suitable conveying-pipes to the reservoir within the blast-furnace, I employ the following means: Secured upon the outer faces of the flanges $d$ of the heads D and D' by means of suitable bolts are covers or caps E and E', resting upon rings $e$ at their outer edges and having at their central part a perforated boss $e^2$. $e^3$ designates ribs connecting the flange $e$ and the boss $e^2$, forming a space $e^4$, adapted when in position upon the heads D and D' to cover the exhaust-section of said heads. $f$ designates ribs, which, with the ribs $e^3$, divide the heads D and D' into quarters, as shown in Fig. 8, forming spaces $f'$, which when the covers are in position upon the heads D and D', are designed to separate the induction and eduction ports. The letter $f^4$ designates metallic plates of the contour of the spaces $f'$ and $e^4$, to which are riveted rubber seats $f^5$, of the contour of the induction and eduction ports; and in order that said valves may be controlled in their movements against the action of the piston and the atmosphere I secure to the metallic plates, as shown in Fig. 7, springs $f^6$.

It has been found in practice that it is only necessary to employ springs on the valves at the lower head of the cylinder, as the valves will of their own gravity remain closed at the upper head of the cylinder.

Projecting from the heads D and D' at the discharge-section thereof the laterally-extending pipes G have bolted to them at their outer ends elbows $g$, which in turn are connected by a vertical pipe H, provided in its side with an opening $h$, adapted to receive one end of a pipe which leads to the blast-furnace. It will thus be seen that about three-quarters of the area of the heads of the cylinder is occupied by the inlet-openings, that have direct communication with the atmosphere through the spaces formed between the flanges of the head; that such inlet-openings are triangular in shape and alternate in position with openings having parallel sides that lead to the cylinder, while the exhaust occupies only about one-quarter of the area of the head; also, that while the openings in the exhaust-section of the heads of the cylinder are the same in outline as those on the inlet-section, yet the position of the valves and the movement of the air are reversed, the parallel-sided openings on the exhaust-section being closed by the valves instead of the triangular shaped openings, as is the case on the inlet-section, so that the air in entering the cylinder first passes through the triangular-shaped openings, (covered by valves,) then through the parallel-sided openings into the cylinder, and in escaping from the cylinder the air first passes through the parallel-sided openings (covered by valves) and thence through the triangular-shaped openings into the exhaust-pipe.

It will be further noted that the valves for closing the openings in the cylinder-head are made in sections or quadrants that have secured thereto a series of cushions that on the inlet-sections fit over the openings from the atmosphere and on the exhaust-section that close the openings from the cylinder, so that the air on entering the cylinder raises the sections of the inlet-section and passes beneath them, thence over the intervening partitions that separate the openings from the atmosphere from the openings leading to the cylinder, and through said openings leading to the cylinder into said cylinder, and when escaping from the cylinder the air passes through the parallel-sided openings of the exhaust-section of the heads of the cylinder, raises the quadrant-section composing the valve of such section, thence over the intervening partitions that separate the openings leading from the cylinder from the openings that lead to the exhaust-pipe, and through such openings that lead to the discharge-pipe to such pipe.

The operation of my improved blowing-engine may be briefly described as follows: Assuming engine to be on the upstroke, Fig. 3, as piston-head moves up air enters cylinder at lower ports, as indicated by arrow 1, pressing valves away from their seats over the induction-ports at bottom of cylinder. The pressure of the air upon top of piston-head as piston-head moves upward raises the exhaust-valves from off their seats at top of cylinder and is forced into pipe H. At the same time that the air on top of piston-head raises the exhaust-valves in the upward movement of the piston-head it also (the position of the inlets to said valves from the cylinder and atmosphere being so changed relatively to each other on the inlet and exhaust sides) exerts a pressure upon the back of the valves covering the induction-ports at the top of the cylinder indicated by the arrow 2, so that entrance of air from outside is prevented and the only outlet of said air is through to the pipe H. Pressure in the pipe H closes the exhaust-valves at the lower end of cylinder, as indicated by arrow 3. In the reverse movement of the piston-head from that shown in Fig. 3 the valves at arrow 1 are closed by the pressure of air in the cylinder exerted upon said valves, while the atmospheric pressure upon the valves covering the induction-ports at the top of cylinder raises said valves and air rushes into cylinder, the air in the cylinder below the piston-head being forced out into pipe H through the exhaust-ports at bottom of cylinder, pressure of air in pipe H holding the valves tightly over the exhaust-openings at the top of cylinder and preventing air from returning to cylinder.

Having thus fully described my invention, what I claim, and desire to secure by Letters Patent, is—

1. In a blowing-engine, an air-cylinder provided at each end with a head having formed therein a series of radial ports, every alternate one of which ports opens upon the exterior of the cylinder-head, while the intermediate port opens upon the interior of said cylinder, for the purpose specified.

2. In a blowing-engine, an air-cylinder provided at each end with a head having formed therein a series of radial induction-ports, each having an opening at the exterior circumference of the head, and said ports occupying the greater portion of the head, and a series of radial eduction-ports arranged upon the same horizontal plane with the induction-ports and occupying a separate smaller section of the head distinct from that occupied by the induction-ports and having a discharge-opening common to all of said eduction-ports.

3. In a blowing-engine, the head composed of an upper and lower flange separated by vertical radial partitions, a portion of which head is devoted exclusively to the induction-ports and a portion devoted exclusively to the eduction-ports and all the ports on the same horizontal plane, a cover divided into recesses to correspond with said induction and eduction sections of the head, and the valves covering such port-sections within the recesses of the cover.

4. In a blowing-engine, the combination, with the air-cylinder, of the heads composed of an upper and lower flange united by vertical radial partitions to form a series of ports for the induction and eduction of the air.

5. In a blowing-engine, the combination, with the air-cylinder, of the heads carried thereby, composed of an upper and lower flange connected by vertical radial partitions forming ports for the induction and eduction of the air, the eduction-ports occupying a distinct section or portion of the heads separate from the induction-ports, but on the same plane.

6. In an air-cylinder, the combination of the radial ported heads divided into eduction and induction sections, all on the same horizontal plane, a metallic valve of the contour of the head, divided into sections and adapted to fit over said eduction and induction sections, the rubber seats secured to the valve-sections of the contour of the eduction and induction ports, and the caps for confining said valves within the heads, substantially as and for the purposes specified.

7. In a blowing-engine, the combination, with the air-cylinder, of the heads carried thereby, composed of an upper and lower flange united by vertical radial partitions forming a series of ports for the induction and eduction of the air, the eduction-ports arranged together and forming a separate section of the head, combined with a cap or cover having radial flanges to separate the eduction from the induction sections of the head.

8. In a blowing-engine, the combination, with the air-cylinder, of the heads carried thereby, composed of an upper and lower flange having formed therein a series of ports for the induction and eduction of the air, the eduction-ports occupying one section of the head and the induction-ports the other section, and each port having two divisions or openings separated by a vertical partition, only one of which openings is closed by a valve, so that the air when entering or leaving the cylinder first passes through one of the openings of the ports and then after lifting the valve escapes through the other opening, as specified.

In testimony whereof I affix my signature in presence of two witnesses.

SERN P. WATT.

Witnesses:
BARTON GRIFFITH,
MERCH E. SWANSON.